(12) United States Patent
Yoon

(10) Patent No.: US 10,885,273 B2
(45) Date of Patent: Jan. 5, 2021

(54) METHOD AND SYSTEM SIMPLIFYING THE INPUT OF SYMBOLS USED AS A PAIR WITHIN A USER INTERFACE

(71) Applicant: Samsung Electronics Co., Ltd., Suwon-si (KR)

(72) Inventor: Yoonjin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/531,639

(22) Filed: Aug. 5, 2019

(65) Prior Publication Data

US 2020/0042590 A1 Feb. 6, 2020

(30) Foreign Application Priority Data

Aug. 6, 2018 (KR) .................. 10-2018-0091294
Jul. 31, 2019 (KR) .................. 10-2019-0093354

(51) Int. Cl.
G06F 40/274 (2020.01)
G06N 3/08 (2006.01)
G06F 3/0488 (2013.01)
G06F 3/0489 (2013.01)

(52) U.S. Cl.
CPC ........ G06F 40/274 (2020.01); G06F 3/04886 (2013.01); G06F 3/04895 (2013.01); G06N 3/08 (2013.01)

(58) Field of Classification Search
CPC .................................................. G06F 40/274
See application file for complete search history.

(56) References Cited

U.S. PATENT DOCUMENTS

| 6,359,572 B1 | 3/2002 | Vale |
| 10,007,425 B2* | 6/2018 | Kim ...................... G06F 40/53 |
| 2004/0145570 A1* | 7/2004 | Curelet-Balan ....... G06F 3/0233 345/168 |
| 2006/0064652 A1* | 3/2006 | Ahokas ................ G06F 3/0236 715/864 |
| 2009/0153488 A1* | 6/2009 | Suzuki ................... G06F 3/023 345/168 |

(Continued)

FOREIGN PATENT DOCUMENTS

| EP | 2 680 120 B1 | 3/2018 |
| JP | 1997-160700 A | 6/1997 |

(Continued)

*Primary Examiner* — Asher D Kells
(74) *Attorney, Agent, or Firm* — Jefferson IP Law, LLP

(57) ABSTRACT

A method and an apparatus for providing a user interface by using an AI system are provided. The method includes displaying an input window for displaying a text input, on a first region of the screen, and displaying a first user interface on a second region of the screen, the first user interface being provided to select a symbol, receiving a user input for selecting a first symbol through the first user interface, when the user input is determined as a first input event for inputting a text between the first symbol and a second symbol used as a pair with the first symbol based on a user input pattern, displaying the first symbol and the second symbol on the input window, and changing the first user interface displayed on the second region into a second user interface for inputting a text between the first symbol and the second symbol.

18 Claims, 12 Drawing Sheets

(56) References Cited

U.S. PATENT DOCUMENTS

| | | | |
|---|---|---|---|
| 2013/0300669 A1* | 11/2013 | Matsuzawa | G06F 3/0237 345/168 |
| 2013/0305178 A1* | 11/2013 | Matsuzawa | G06F 3/0238 715/773 |
| 2013/0307784 A1* | 11/2013 | Matsuzawa | G06F 3/04886 345/169 |
| 2014/0035823 A1* | 2/2014 | Khoe | G06F 40/232 345/171 |
| 2014/0282158 A1* | 9/2014 | Wolfram | G06F 3/04842 715/767 |
| 2017/0010803 A1* | 1/2017 | Hillion | G06F 3/0238 |
| 2019/0235638 A1* | 8/2019 | Lee | G06F 3/04886 |

FOREIGN PATENT DOCUMENTS

| | | |
|---|---|---|
| JP | 2009-146065 A | 7/2009 |
| KR | 10-2017-0114649 A | 10/2017 |

\* cited by examiner

FIG. 4

| CLASSIFICATION (410) | REPRESENTATION (420) | IDENTIFICATION CODE (430) |
|---|---|---|
| PARENTHESES | ( ) | #### |
| CORNER BRACKETS | 「 」 | #### |
| DOUBLE CORNER BRACKETS | 『 』 | #### |
| BRACES | { } | #### |
| SQUARE BRACKETS | [ ] | #### |
| ANGLE BRACKETS | 〈 〉 | #### |
| DOUBLE ANGLE BRACKETS | 《 》 | #### |
| OTHERS | 〔〕 〖〗 | #### |
| ... | | |

FIG. 5

| FIRST INPUT EVENT (610) | SECOND INPUT EVENT (620) |
|---|---|
| ( l ) | ( l |
| WHEN TIME PERIOD OF USER INPUT MAINTAINED FOR SELECTING FIRST SYMBOL IS EQUAL TO OR GREATER THAN PRESET THRESHOLD VALUE (612) | OTHER USER INPUTS (622) |
| WHEN PAST HISTORY OF TEXT INPUT BY USER BEFORE RECEIVING USER INPUT FOR SELECTING FIRST SYMBOL USED WITH FIRST SYMBOL IS REFERRED (614) | |
| WHEN FIRST SYMBOL CORRESPONDS TO SYMBOL SET IN ADVANCE TO BE USED AS PAIR (616) | |

METHOD AND SYSTEM SIMPLIFYING THE INPUT OF SYMBOLS USED AS A PAIR WITHIN A USER INTERFACE

CROSS-REFERENCE TO RELATED APPLICATION(S)

This application is based on and claims priority under 35 U.S.C. § 119(a) of a Korean patent application number 10-2018-0091294, filed on Aug. 6, 2018, in the Korean Intellectual Property Office, and a Korean patent application number 10-2019-0093354, filed on Jul. 31, 2019, in the Korean Intellectual Property Office, the disclosures of each of which is incorporated by reference herein in its entirety.

BACKGROUND

1. Field

The disclosure relates to an artificial intelligence (AI) system for mimicking functions such as cognition and determination of the human brain by utilizing a machine learning algorithm such as deep learning and an application thereof. More particularly, the disclosure relates to a method and apparatus for providing a user interface by using an AI system.

2. Description of Related Art

Artificial intelligence (AI) system is a computer system that implements human-level intelligence. Unlike existing Rule-based smart systems, AI is a system in which machines learn, judge and become smart. AI systems are increasingly recognized and improving their understanding of user preferences as they are used, and existing rule-based smart systems are gradually being replaced with deep-learning-based AI systems.

AI technology consists of machine learning (deep learning) and element technologies that utilize machine learning.

Machine learning is an algorithm technology that classifies/learns the characteristics of input data by itself. Element technology is a technology that simulates functions such as recognition and judgment of human brain using machine learning algorithms such as deep learning, and consists of technical fields such as linguistic understanding, visual understanding, reasoning/prediction, knowledge representation, and motion control.

The various fields in which AI technology is applied are as follows. Linguistic understanding is a technique for recognizing, applying, and processing human language/characters, and includes natural language processing, machine translation, dialogue system, query response, speech recognition/synthesis, and the like. Visual understanding is a technique for recognizing and processing objects as human vision, and includes object recognition, object tracking, image search, human recognition, scene understanding, spatial understanding, image enhancement, etc. Reasoning/prediction is a technique for judging and logically inferring and predicting information, and includes knowledge/probability based reasoning, optimization prediction, preference base planning, and recommendation. Knowledge representation is a technique for automating human experience information into knowledge data, and includes knowledge building (data generation/classification) and knowledge management (data utilization). The motion control is a technique for controlling autonomous travel of a vehicle and motion of a robot, and includes motion control (navigation, collision, traveling), operation control (behavior control), etc.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for providing a user interface for inputting symbols that are used as pairs.

Additional aspects will be set forth in part in the description which follows and, in part, will be apparent from the description, or may be learned by practice of the presented embodiments.

In accordance with an aspect of the disclosure, a method, performed by an electronic device, of providing a user interface on a screen of the electronic device is provided. The method includes displaying an input window on a first region of the screen, the input window displaying a text input by a user, and displaying a first user interface on a second region of the screen, the first user interface being provided to select a symbol, receiving a user input for selecting a first symbol through the first user interface, when the user input is determined as a first input event for inputting a text between the first symbol and a second symbol that is used as a pair with the first symbol, based on a user input pattern, displaying the first symbol and the second symbol on the input window, and changing the first user interface displayed on the second region into a second user interface for inputting a text between the first symbol and the second symbol.

In accordance with another aspect of the disclosure, an electronic device is provided. The electronic device includes a display, a storage storing one or more instructions, and a processor configured to execute the one or more instructions.

The processor is configured to, by executing the one or more instructions stored in the storage, display an input window on a first region of a screen, the input window displaying a text input by a user, and displaying a first user interface on a second region of the screen, the first user interface being provided to select a symbol, receive a user input for selecting a first symbol through the first user interface, when the user input is determined as a first input event for inputting a text between the first symbol and a second symbol that is used as a pair with the first symbol based on a user input pattern, display the first symbol and the second symbol on the input window, and change the first user interface displayed on the second region into a second user interface for inputting a text between the first symbol and the second symbol.

In accordance with another aspect of the disclosure, a non-transitory computer-readable recording medium having recorded thereon a program to be executed on a computer is provided. The program includes displaying an input window on a first region of a screen of an electronic device, the input window displaying a text input by a user, and displaying a first user interface on a second region of the screen, the first user interface being provided to select a symbol, receiving a user input for selecting a first symbol through the first user interface, when the user input is determined as a first input event for inputting a text between the first symbol and a second symbol that is used as a pair with the first symbol based on a user input pattern, displaying the first symbol and the second symbol on the input window, and changing the first user interface displayed on the second region into a second user interface for inputting a text between the first symbol and the second symbol.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a diagram of a table defining at least one pair of symbols according to an embodiment of the disclosure;

FIG. 5 is a diagram illustrating a case, in which a user input for selecting a first symbol received by an electronic device corresponds to a first input event according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein will be described briefly, and various embodiments of the disclosure will be described in detail.

It will be further understood that the terms "comprises" and/or "comprising," when used in this specification, specify the presence of stated components, but do not preclude the presence or addition of one or more components. In addition, the terms such as " . . . unit", "module", etc. provided herein indicates a unit performing at least one function or operation, and may be realized by hardware, software, or a combination of hardware and software.

Throughout the disclosure, the expression "at least one of a, b, or c" indicates only a, only b, only c, both a and b, both a and c, all of a, b, and c, or variations thereof.

Figure 1:
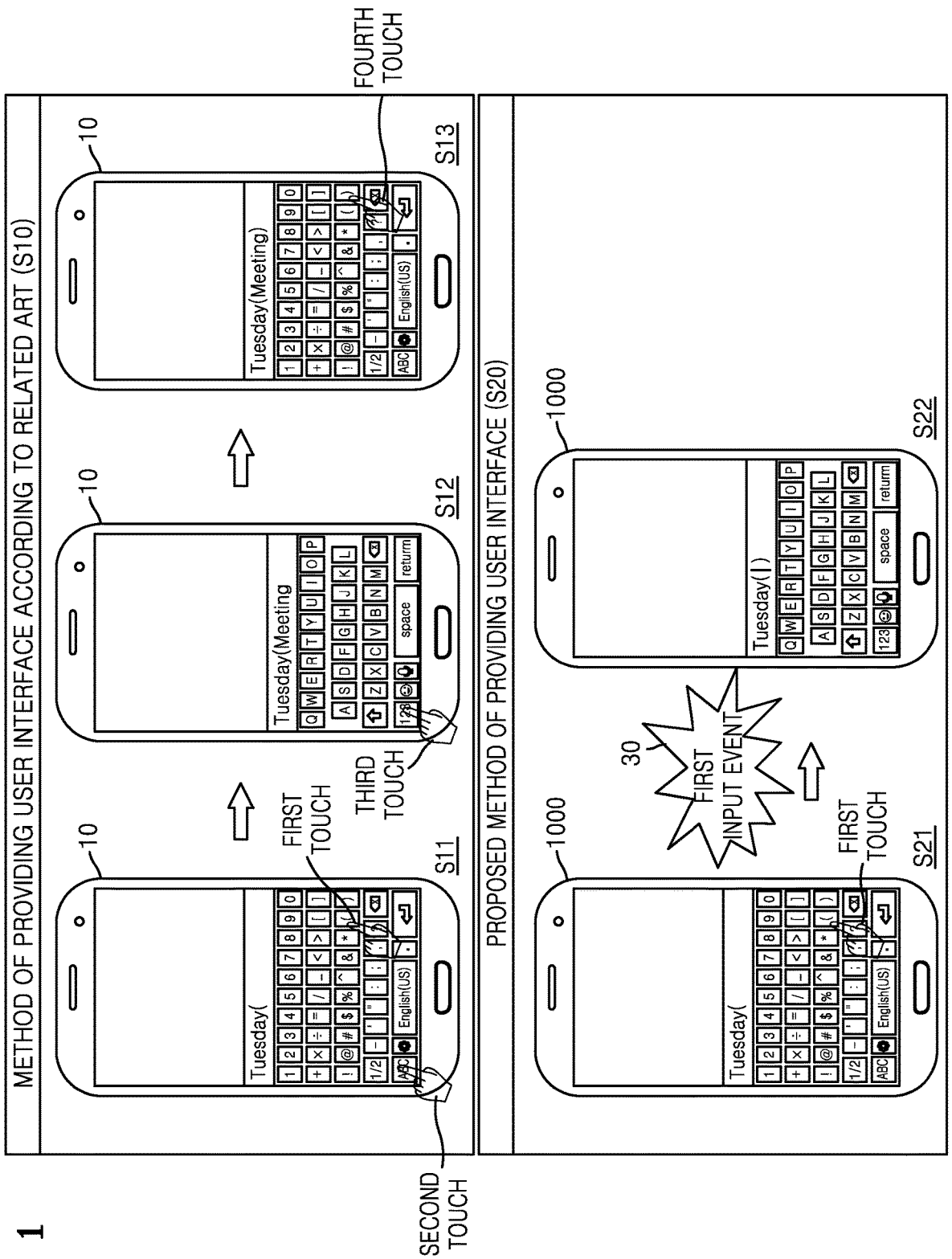
FIG. 1 is a diagram illustrating a system for providing a user interface according to an embodiment of the disclosure.

FIG. 1 is a diagram illustrating a system for providing a user interface according to an embodiment of the disclosure.

Referring to FIG. 1, the system for providing a user interface according to an embodiment of the disclosure may include an electronic device 1000. According to an embodiment of the disclosure, the system for providing the user interface may further include a server (not shown) in addition to the electronic device 1000, and may separately include a user input device that receives a user input for inputting text.

According to an embodiment of the disclosure, the electronic device 1000 may be implemented in various types. For example, the electronic device 1000 described herein may include a digital camera, a mobile terminal, a smart phone, a laptop computer, a tablet personal computer (PC), an electronic book terminal, a digital broadcasting terminal, a personal digital assistant (PDA), a portable multimedia player (PMP), a navigation device, an moving picture experts group phase 1 or phase 2 (MPEG-1 or MPEG-2) audio layer 3 (MP3) player, etc., but is not limited thereto.

The electronic device 1000 described herein may include a wearable device worn on a user. The wearable device may include, but is not limited to, at least one of an accessory type device (e.g., a watch, a ring, a bracelet, an anklet, a necklace, a glasses, or a contact lens), a head-mounted device (HMD), a fabric or clothing integrated type device (e.g., electronic clothing), a body-mounted type device (e.g., a skin pad), or a bio-implantable type (e.g., an implantable circuit). Hereinafter, for convenience of description, a case in which the electronic device 1000 is a smart phone will be described below.

According to an embodiment of the disclosure, the electronic device 1000 may be a device providing a user interface. The user interface may be an interface for a user, which receives a user input (e.g., text input) from the user and provides a response with respect to the user input. According to an embodiment of the disclosure, the user interface may be a hardware or software module receiving a user input for inputting text, symbols, etc. from the user.

The electronic device 1000 described herein is a device for providing a user interface for inputting text or symbols, and in particular, may provide the user with an interface having improved user convenience when the user is to input text between bundle table. In the specification of the disclosure, the bundle table may denote symbols that distinguish numbers, characters, phrases, formulas, text, etc. from other number, characters, phrases, formulas, text, etc. by blocking front and back of the numbers, characters, phrases, formulas, text, etc. For example, the bundle table may include parenthesized symbols such as parentheses, braces, and square brackets, as described below.

For example, according to a user interface provided by an electronic device 10 of the related art (e.g., S10), a user has to, in order to input text between parentheses, select an open parenthesis (first touch, e.g. S11) from the user interface for inputting symbols, perform a selection for changing the user interface for inputting symbols into a user interface for inputting text (second touch, e.g. S11), perform a selection for changing the user interface for inputting text into the user interface for inputting symbols after inputting text (third touch, e.g. S12), and select a close parenthesis from the user interface for selecting symbols (fourth touch, e.g. S13).

However, in the user interface provided by the electronic device 1000 according to the embodiment of the disclosure (e.g., S20), in order to input text between parentheses, the user may only perform a process of touching an open parenthesis from a user interface for inputting symbols for a preset threshold time period or longer (first touch), and then, a close parenthesis that is used as a pair with the open parenthesis is automatically generated and the text may be easily input between the generated open and close parentheses.

According to the embodiment of the disclosure, the electronic device 1000 may sense a user input of long-tapping (or touching) one of the bundle table from a user interface, in order to determine (analyze or infer) intension of the user, that is, inputting text between the bundle table symbols that are used as a pair.

The electronic device 1000 may determine (analyze or infer) a type of an input event (e.g., first input event 30) corresponding to the user input (e.g., first touch S21) by using an artificial intelligence (AI) model, and determine (analyze or infer) the intension of the user based on the determined type of the input event to provide a user interface adaptively according to the intension of the user. For example, the electronic device 1000 determines the intension of the user, that is, inputting text between the bundle table, according to the type of the input event corresponding to the user input, and when the intension of the user is determined to input the text between the bundle table, the electronic device 1000 may provide the user with the user interface adaptively in response to the user input (e.g., user interface displayed at S22).

In the specification, the input event may denote an event regarding a user's intension to input text between bundle table symbols that are used as a pair. In the specification, the input event may be classified as a first input event and a second input event according to the user's intension to input text between bundle table symbols, but is not limited thereto.

For example, the electronic device 1000 described herein may determine whether a user input that is input through a user interface corresponds to a first input event or a second input event based on a time period of the user input maintained input through the user interface. Hereinafter, an operation of the electronic device 1000 for providing a user interface on a screen will be described in detail with reference to FIG. 2.

Figure 2:
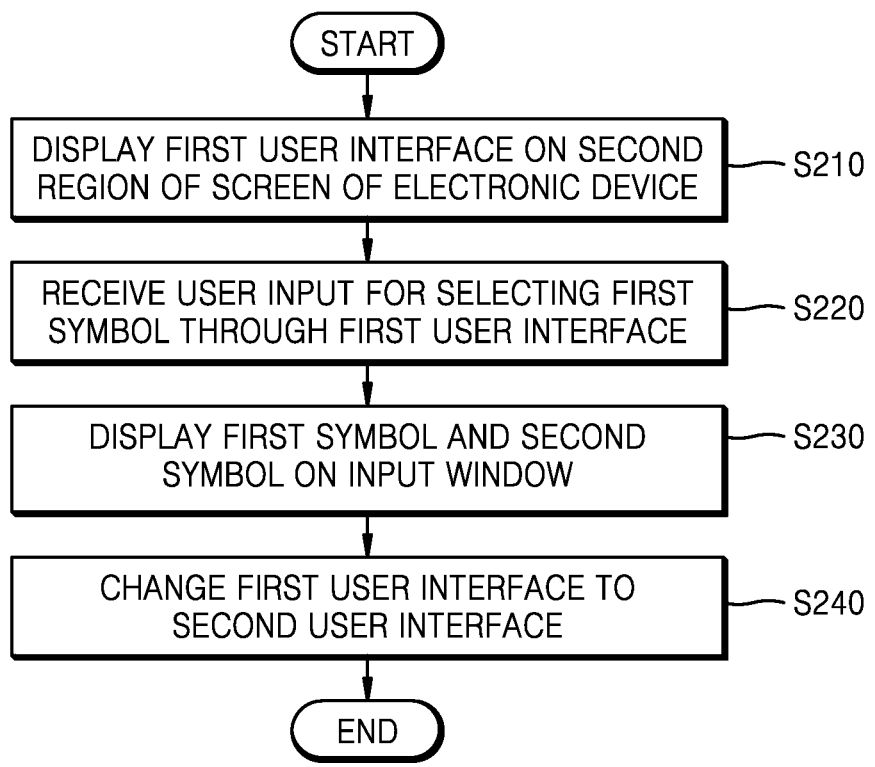
FIG. 2 is a flowchart illustrating a method of providing a user interface on a screen by an electronic device according to an embodiment of the disclosure.

FIG. 2 is a flowchart illustrating a method of providing a user interface on a screen by an electronic device according to an embodiment of the disclosure.

Referring to FIG. 2, in operation S210, the electronic device 1000 may display an input window on a first region of a screen of the electronic device 1000, wherein the input window displays text input by the user, and may display a first user interface for selecting symbols on a second region of the screen. For example, the first region, on which the input window displaying text is displayed, may be located at an upper end of the screen of the electronic device 1000, and the second region, on which the user interface for selecting symbols or text is displayed, may be located at a lower end of the screen of the electronic device 1000. However, one or more embodiments of the disclosure are not limited thereto.

For example, the electronic device 1000 may include an application on a memory thereof, wherein the application controls a first region for displaying an input window, a second region for inputting symbols or text, and a third region for inputting candidate text that will be described later to be displayed on the screen. According to an embodiment of the disclosure, the electronic device 1000 may set arrangement of the first region, the second region, and the third region displayed on the screen differently according to a type and a purpose of the application stored in the memory.

In operation S220, the electronic device 1000 may receive a user input for selecting a first symbol through a first user interface.

According to an embodiment of the disclosure, the first user interface may be a user interface for inputting symbols. The first user interface of the disclosure may be displayed on the same screen as a second user interface for inputting text (or string), or may be displayed on a different screen from that of the second user interface. For example, the first user interface and the second user interface described herein may be displayed on different screens from each other.

The first user interface and the second user interface may be implemented as a touch screen on the screen of the electronic device 1000, but may be implemented as a user input device that is separately provided from the electronic device 1000. Also, the first user interface and the second user interface described herein may include QWERTY (two-set type, three-set type), a Google short-vowel type, a Chunjiin type, a Naratgeul type, a Sky type, and a handwriting type, but is not limited thereto.

The bundle table described herein may be used as a pair that blocks front and back of numbers, characters, phrases, formulas, and text in order to discriminate from other numbers, characters, phrases, formulas, and text outside the bundle table. For example, the bundle table may include a first symbol representing start of the bundle table (open symbol) and a second symbol representing end of the bundle table (close symbol). That is, the first symbol and the second symbol may be used as a pair.

In an embodiment of the disclosure, the user input for selecting the first symbol may denote an electrical signal generated at a touch screen when the user touches the first user interface. The electronic device 1000 receives the user input for selecting the first symbol, and displays an input window indicating the first symbol according to the user input on the first region of the screen.

In operation S230, the electronic device 1000 may display the first symbol and the second symbol in the input window. According to an embodiment of the disclosure, the electronic device 1000 receives the user input for selecting the first symbol and the second symbol through the first user interface, and displays the input window indicating the first symbol and the second symbol according to the user input on the first region of the screen. According to another embodiment of the disclosure, when receiving the user input for selecting the first symbol through the first user interface, the electronic device 1000 generates the second symbol based on the user input and automatically display the second symbol in the input window of the screen.

According to an embodiment of the disclosure, the electronic device 1000 may display a cursor indicating a location of text that is to be input by the user between the first symbol and the second symbol. For example, the electronic device 1000 generates the second symbol that is used as a pair with the first symbol based on the user input for selecting the first symbol, and displays the second symbol in the input window with the first symbol and further displays the cursor indicating the location to which the text is to be input between the first symbol and the second symbol.

In operation S240, the electronic device 1000 may change the first user interface into the second user interface for inputting text. In an embodiment of the disclosure, the electronic device 1000 displays the second symbol in the input window on the screen based on the user input for selecting the first symbol and may change the first user interface into the second user interface for inputting text or strings. According to another embodiment of the disclosure, the electronic device 1000 displays the generated second symbol in the input window of the screen based on the user input for selecting the first symbol, and at the same time, the electronic device 1000 may change the first user interface into the second user interface.

According to an embodiment of the disclosure, the electronic device 1000 may train a third prediction model based on past history information about text used with the first symbol and the second symbol, and may determine a type of the second user interface by using the trained third prediction model. That is, when the user input for selecting the first symbol is determined as a first input event, the electronic device 1000 may change the first user interface into the second user interface, and when the first user interface is changed into the second user interface, the type of the second user interface may be determined by using the third prediction model.

The third prediction model described herein may be included user interface providing models (AI models) stored in the memory of the electronic device 1000.

According to another embodiment of the disclosure, the electronic device 1000 may display at least one candidate text to be input between the first symbol and the second symbol on the third region of the screen.

For example, the electronic device 1000 generates the second symbol that is used as a pair with the first symbol based on the user input for selecting the first symbol, and displays the second symbol in the input window with the first symbol and further displays the cursor indicating the location to which the text is to be input between the first symbol and the second symbol. In addition, the electronic device 1000 changes the first user interface to the second user interface, and may display at least one candidate text to be input between the first symbol and the second symbol on the third region of the screen.

In an embodiment of the disclosure, in order to display at least one candidate text to be input between the first symbol and the second symbol on the third region of the screen, the electronic device 1000 may select one of a plurality of language models that are learned based on past usage information about text that the user has used, may receive recommendation of at least one candidate text from the selected language model, and may display at least one recommended candidate text on the third region. According to another embodiment of the disclosure, the electronic device 1000 determines a priority order of the at least one candidate text recommended from the selected language model based on the past usage information about the text that the user has used, and may display recommended candidate text on the third region according to the determined priority order.

The plurality of language models learned based on the past usage information about the text that the user has used will be described in detail later with reference to FIGS. 7 and 8. Hereinafter, an operation of the electronic device 1000 for determining a type of the user input for selecting the first symbol will be described in detail with reference to FIG. 3.

Figure 3:
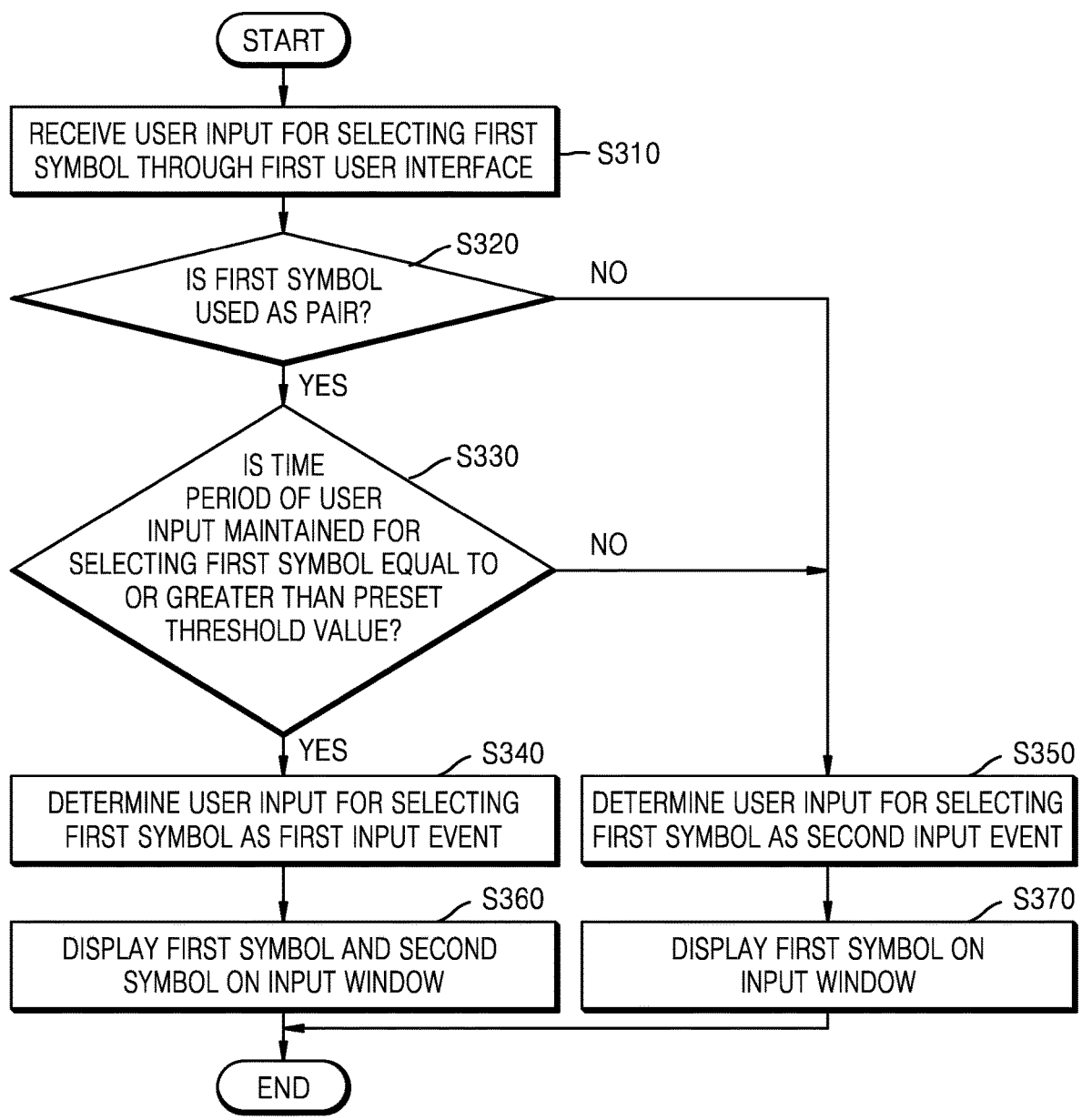
FIG. 3 is a diagram illustrating an operation of an electronic device, wherein the operation is to determine whether a user input for selecting a first symbol corresponds to a first input event or a second input event according to an embodiment of the disclosure.

FIG. 3 is a diagram illustrating an operation of an electronic device, wherein the operation is to determine whether a user input for selecting a first symbol corresponds to a first input event or a second input event according to an embodiment of the disclosure.

Referring to FIG. 3, in operation S310, the electronic device 1000 may receive a user input for selecting a first symbol through a first user interface. Because operation S310 corresponds to operation S220 shown in FIG. 2, detailed descriptions thereof are omitted.

In operation S320, the electronic device 1000 receives a user input for selecting the first symbol, and may identify whether the first symbol according to the user input is used as a pair with the second symbol. According to an embodiment of the disclosure, the electronic device 1000 may store a table defining at least one pair of symbols in the memory, and may identify whether the first symbol according to the user input is used as a pair by using the table stored in the memory. The table defining at least one pair of symbols will be described in detail later with reference to FIG. 4.

In operation S330, the electronic device 1000 may determine whether a time period of the user input maintained for selecting the first symbol is equal to or greater than a preset threshold value. According to an embodiment of the disclosure, the electronic device 1000 may check the time period of the user input maintained for selecting (touching) the first user interface displayed on the screen. In the specification of the disclosure, the time period of the user input maintained may denote a time period during which the hand of the user is in contact with a screen (touch screen) of the electronic device 1000. According to an embodiment of the disclosure, the preset threshold value may denote a preset threshold time.

In operation S340, based on the user input for selecting the first symbol, when the first symbol is used as a pair and the time period of the user input maintained for selecting the first symbol is equal to or greater than the preset threshold value or greater, the electronic device 1000 may determine that the user input for selecting the first symbol is a first input event for inputting text between the first symbol and the second symbol. According to an embodiment of the disclosure, the first input event may denote a user's certain gesture for touching the first user interface, for example, may denote a long touch or a long tab, that is, touching the first user interface for a preset threshold time period or longer.

In operation S350, based on the user input for selecting the first symbol, when the first symbol is not a symbol that is used as a pair or when the time period of the user input maintained for selecting the first symbol is less than the preset threshold value, the electronic device 1000 may determine that the user input for selecting the first symbol is a second input event for displaying the first symbol.

In operation S360, when it is determined that the user input for selecting the first symbol is the first input event, the electronic device 1000 may display the first symbol and the second symbol on the input window. According to an embodiment of the disclosure, when it is determined that the user input for selecting the first symbol is the first input event, the electronic device 1000 displays the first symbol and the second symbol on the input window and may further display a cursor for inputting text between the first symbol and the second symbol. The first symbol and the second symbol described herein may include a bundle table.

According to another embodiment of the disclosure, when it is determined that the user input for selecting the first symbol is the first input event, the electronic device 1000 may display the second symbol that is used as a pair with the first symbol on the input window, display a cursor for inputting text between the first symbol and the second symbol, and change the first user interface for inputting the symbol that is currently displayed on the screen into the second user interface for inputting the text.

In operation S370, when it is determined that the user input for selecting the first symbol is the second input event, the electronic device 1000 may display the first symbol on the input window. That is, when the first symbol input by the user is not the symbol used as a pair or the time period of the user input maintained for selecting the first symbol is less than the preset threshold value, the electronic device 1000 may display only the first symbol input by the user on the input window.

The electronic device 1000 according to the embodiment of the disclosure may recognize intension of the user for inputting the text between the first symbol and the second symbol based on the type of user input for selecting the first symbol. That is, when it is determined that the user input for selecting the first symbol is the first input event, the electronic device 1000 may determine (analyze or infer) that the user has an intension of inputting the text between the first symbol and the second symbol. In addition, when it is determined that the user input for selecting the first symbol is the second input vent, the electronic device 1000 may determine (analyze or infer) that the user has an intension of only using the first symbol or of not using the second symbol.

That is, the electronic device 1000 may determine whether the first symbol is input in order to input the text between the first symbol and the second symbol, based on the type of user input for selecting the first symbol.

FIG. 4 is a diagram of a table defining at least one pair of symbols according to an embodiment of the disclosure.

According to an embodiment of the disclosure, the electronic device 1000 may store a table 400 defining at least one pair of symbols in the memory and may identify that the first symbol input by the user is used as a pair by using the table defining the pair of symbols stored in the memory.

The pair of symbols described herein may denote all types of symbols that are used as pairs. Also, the symbols used as a pair described herein may include the bundle table, but are not limited thereto, and may further include user-defined symbols that are defined to be used as pairs by the user.

When the table defining the pair of symbols is stored in the memory, the electronic device 1000 may use an identification code 430 indicating each pair of symbols. According to an embodiment of the disclosure, the electronic device 1000 matches an identification code to each pair of symbols, and the pairs of symbols matched to the identification codes may be stored in the memory. Also, the electronic device 1000 classifies the pairs of symbols according to types of the pairs of symbols (e.g., classification 410), matches the identification codes to the classified pairs of symbols, and stores the classified pairs of symbols matching to the identification codes in the memory. For example, the electronic device 1000 may classify the pairs of symbols according to whether the pair of symbols corresponds to the bundle table or user-defined symbols. According to an embodiment of the disclosure, the table 400 may store a representation 420 of one or more pairs of symbols.

FIG. 5 is a diagram illustrating a case, in which a user input for selecting a first symbol received by an electronic device corresponds to a first input event according to an embodiment of the disclosure.

Referring to FIG. 5, when it is determined that the user input for selecting the first symbol corresponds to a first input event 610, the electronic device 1000 may display a first symbol '('and a second symbol')' on the input window and may display a cursor for inputting text between the first symbol and the second symbol. According to another embodiment of the disclosure, when it is determined that the user input for selecting the first symbol is a second input event 620, the electronic device 1000 displays the first symbol on the input window and may display a cursor for inputting the text next to the first symbol.

As described above, the electronic device 1000 according to the embodiment of the disclosure may determine that the user input for selecting the first symbol is the first input event when the user input for selecting the first symbol is equal to or greater than the preset threshold value (612). Also, when the text input by the user before the user input for selecting the first symbol is input has been frequently used with the first symbol, the electronic device 1000 may determine that the user input for selecting the first symbol is the first input event based on history of the text input by the user before receiving the user input, wherein the history indicates that the text has been frequently used with the first symbol (614).

In detail, when receiving the user input for selecting the first symbol after the user input for selecting text that has been frequently used with the first symbol, the electronic device 1000 of the embodiment of the disclosure may determine that the user input for selecting the first symbol is the first input event by using an AI model that is trained based on the history that the text input by the user has been used with the first symbol.

When it is determined that the user input for selecting the first symbol is the first input event, the electronic device 1000 according to the embodiment of the disclosure may recommend candidate text to be input between the first symbol and the second symbol, by using the AI model trained based on the history that the text input by the user has been used with the first symbol.

Also, when the first symbol input by the user corresponds to a symbol that is preset to be used as a pair by the user (616), the electronic device 1000 may determine that the user input for selecting the first symbol is the first input event. That is, when the first symbol input by the user corresponds to the user-defined symbol that is set to be used as a pair in advance by the user, the electronic device 1000 may determine that the user input for selecting the first symbol as the first input event without taking into account the time period of the user input maintained for selecting the first symbol. The pairs of symbols to be included in the user-defined symbols that are set to be used as pairs by the user may be edited or modified and refined via the user interface of the electronic device 1000.

When the time period of the user input maintained for selecting the first symbol is less than the preset threshold value or when the first symbol input by the user does not correspond to the symbol that is preset to be used as a pair in advance by the user, or when the first symbol input by the user correspond to the symbol that is preset based on the other user inputs (622), the electronic device 1000 may determine that the user input for selecting the first symbol as the second input event.

Figure 6:
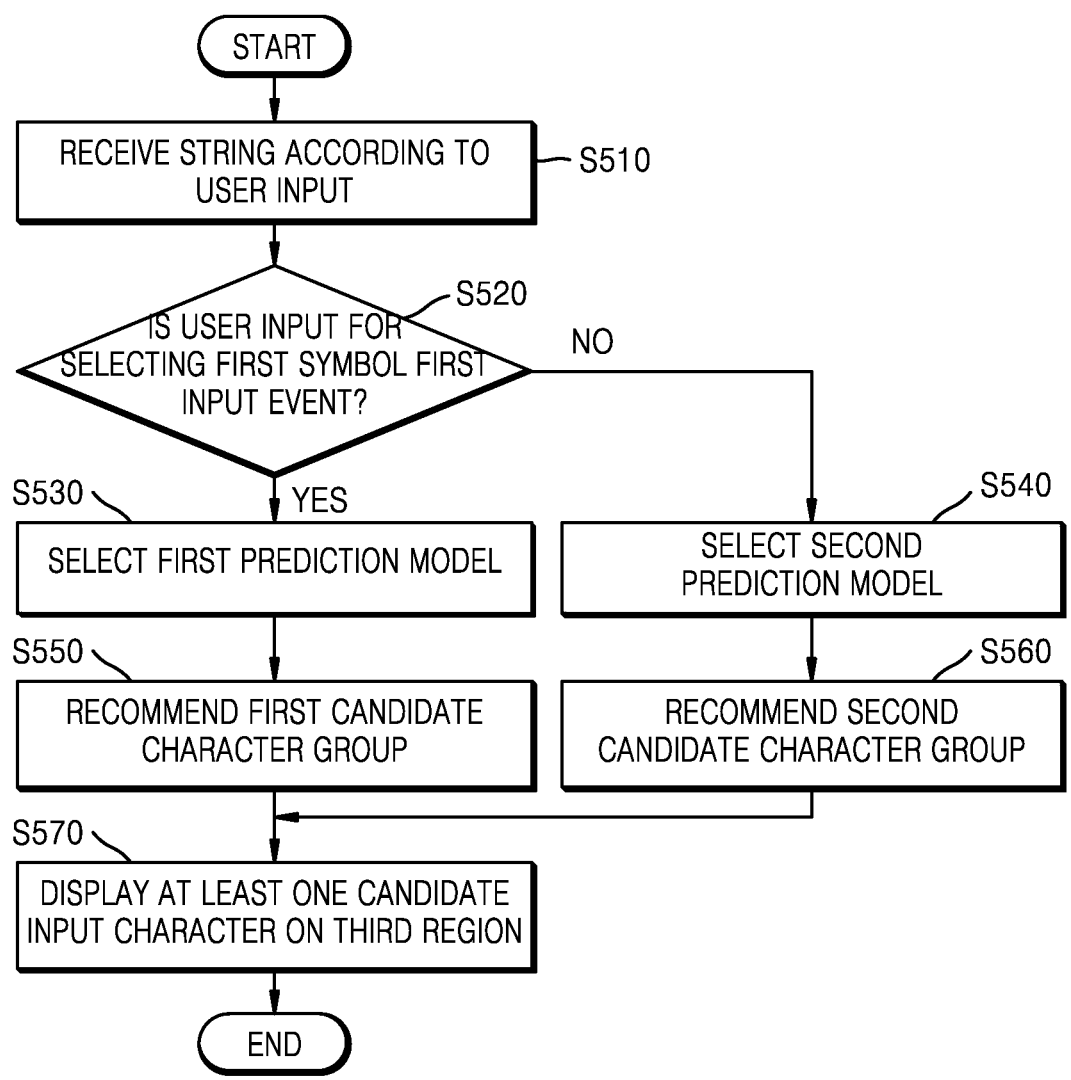
FIG. 6 is a diagram illustrating an operation, performed by an electronic device for selecting candidate text by using different language models according to a type of input event corresponding to a user input for selecting a first symbol according to an embodiment of the disclosure.

FIG. 6 is a diagram illustrating an operation, performed by an electronic device for selecting candidate text by using different language models according to a type of input event corresponding to a user input for selecting a first symbol according to an embodiment of the disclosure.

Referring to FIG. 6, the electronic device 1000 according to an embodiment of the disclosure may display at least one candidate text to be input between the first symbol and the second symbol on the third region of the screen, based on the type of user input for selecting the first symbol. The candidate text described herein denotes a text that may be input between the first symbol and the second symbol, and the text may be recommended from a plurality of language models stored in the electronic device 1000.

When the text input by the user is displayed, an electronic device 10 according to the related art may recommend candidate texts that are expected to be input next to the input text by using a language model stored therein. However, the electronic device 1000 according to the embodiment of the disclosure may adaptively use language models stored therein according to the type of user input, and thus, may recommend different candidate texts.

In operation S510, the electronic device 1000 may receive a string according to an input by the user. The string as described herein may include text or symbols.

In operation S520, the electronic device 1000 may determine whether the user input for selecting the first symbol is the first input event. Because operation S520 may correspond to operations S320 and S330 of FIG. 3, detailed descriptions thereof are omitted.

In operation S530, when the user input for selecting the first symbol is determined as the first input event, the electronic device 1000 may select a first prediction model that is from among the language models stored in the electronic device 1000 and is trained based on information about the text that has been used by the user with the symbol used as a pair. In operation S540, when the user input for selecting the first symbol is determined as the second input event, the electronic device 1000 may select a second prediction model that is trained based on past usage information of the text that has been used by the user from among the language models stored in the electronic device 1000.

In operation S550, the electronic device 1000 may receive recommendation of first candidate character group from the selected first prediction model. For example, the first prediction model described in the specification is a language model trained based on information about text used by the user with the symbol that is used as a pair from the past usage information of the text used by the user, and may be a language model specified for recommending text to be input between the symbols that are used as a pair. Therefore, the first candidate character group recommended from the first prediction model may be candidate text that is specified for being input between the symbols used as a pair from among the candidate texts.

In operation S560, the electronic device 1000 may receive a recommendation of a second candidate character group from the selected second prediction model. For example, the second prediction model described herein is a language model trained based on past usage information of the text that has been used by the user, and may be a language model for recommending general text. That is, the second prediction model may be a language model trained based on past usage information about all text used by the user, not limited to information about the text used by the user with the symbols that are used as a pair. Therefore, the second candidate character group recommended from the second prediction model may be candidate text recommended from general language model.

Processes of training the first prediction model and the second prediction model will be described in detail later with reference to FIG. 7. Also, the first candidate character group recommended from the first prediction model and the second candidate character group recommended from the second prediction will be described in detail later with reference to FIG. 9.

In operation S570, the electronic device 1000 may display the recommended first candidate character group or the second candidate character group on the third region of the screen thereof. According to an embodiment of the disclosure, the third region may be between the first region where the input window for displaying text is displayed and the second region where the user interface for selecting the symbol or the text is displayed, but is not limited thereto. Therefore, the location of the third region, on which the candidate text provided by the electronic device 1000 is displayed, may be set arbitrarily on the screen. The first prediction model and the second prediction model described herein are language models, and may be stored in the memory separately from a user interface provided model (AI model), but may be integrated with the user interface provided model to be used to provide the candidate text.

Figure 7:
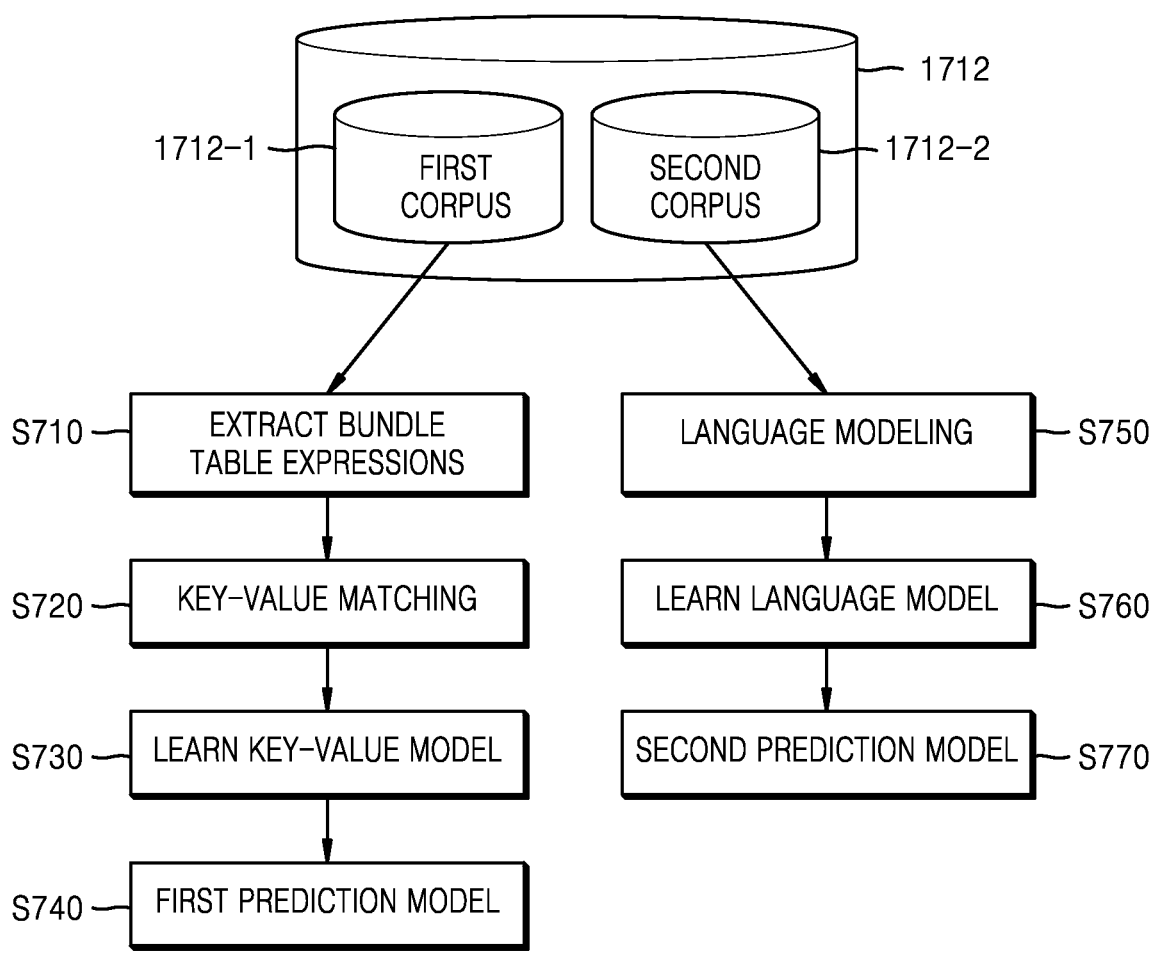
FIG. 7 is a diagram illustrating an operation for leaning different language models according to a type of a user input for selecting a first symbol, wherein the user input is received by an electronic device according to an embodiment of the disclosure.

FIG. 7 is a diagram illustrating an operation for training different language models according to a type of a user input for selecting a first symbol, wherein the user input is received by an electronic device according to an embodiment of the disclosure.

Referring to FIG. 7, according to an embodiment of the disclosure, the electronic device 1000 may learn a plurality of language models for recommending candidate text from Corpus. Corpus, as described herein, may denote a set of natural language samples and may include data about text input by the user of the electronic device 1000. The corpus described herein may include a first corpus 1712-1 and a second corpus 1712-2, as described later.

For example, the first corpus 1712-1 may denote a set of natural language samples or a set of texts related to symbols used as pairs (e.g., bundle table) from among the data about the text input by the user of the electronic device 1000. According to an embodiment of the disclosure, the first corpus 1712-1 may store the text used with the bundle table after matching the text to the candidate text that corresponds to the text used with the bundle table and is used between the bundle table.

TABLE 1

| CORPUS | {Key: | Value} |
|---|---|---|
| Gross Domestic Product (GDP) | Gross Domestic Product | GDP |
| IMF (International Monetary Fund Home Page) | IMF | International Monetary Fund Home Page |
| World Trade Organization (WTO) | World Trade Organization | WTO |

For example, referring to Table 1 above, the first corpus 1712-1 may include a set of texts (gross domestic product, IMF, World Trade Organization, etc.) regarding symbols used as pairs (e.g., bundle table). The first corpus 1712-1 may store the text 'gross domestic product' that is used with the parentheses '( )', that is, the bundle table, and a candidate text 'GDP' that corresponds to the text 'gross domestic product' that is used with the parentheses and is used between the parentheses, after matching them.

According to an embodiment of the disclosure, a second corpus 1712-2 may denote a set including natural language samples and may include data about the text input by the user of the electronic device 1000. That is, the second corpus 1712-2 may include all of sets of natural languages used in general language model, without being limited to the text related to the symbols used as pairs, from among the data about the text input by the user.

In operation S710, the electronic device 1000 may extract expressions of bundle table from the corpus. For example, the electronic device 1000 obtains a set of texts related to the bundle table from the corpus, and may extract, from the set of texts related to the bundle table, the bundle table expressions including the text used with the bundle table and candidate text corresponding to the text used with the bundle table and used between the bundle table.

In operation S720, from the extracted bundle table expressions, the electronic device 1000 may match the text used with the bundle table to the candidate text corresponding to the text used with the bundle table and used between the bundle table. For example, in the set of texts related to the bundle table obtained from the corpus, the electronic device 1000 may set the text used with the bundle table as a key and the candidate text corresponding to the bundle table and used between parentheses as a value and then match the key to the value, and thus, may generate a key-value pair.

According to an embodiment of the disclosure, when the electronic device 1000 trains the first prediction model by using the first corpus 1712-1, the first corpus 1712-1 stores the text used with the bundle table and the candidate text corresponding to the text used with the bundle table and used between the bundle table, wherein the text and the candidate text match each other, and thus, operations S710 and S720 may be omitted.

In operation S730, the electronic device 1000 may learn the key-value model by using the matching text (key) used with the bundle table and the candidate text (value) corresponding to the text used with the bundle table and used between the bundle table. The key-value model described herein is a type of language model, and the language model may output 'GDP' as the value when receiving an input of 'gross domestic product' as a key. In operation S740, the electronic device 1000 may generate the first prediction model by using the learned key-value model. For example, the electronic device 1000 may learn the key-value model by using a dictionary, Memory NN, sequence-to-sequence, and sequence model learning algorithm.

In operation S750, the electronic device 1000 may perform a language modeling operation from the second corpus 1712-2 by using a sequence model learning algorithm. For example, the electronic device 1000 may extract a word sequence from the data about the text input by the user stored in the second corpus 1712-2, and analyzes probability distribution of the extracted word sequence to perform the modeling operation.

In operation S760, the electronic device 1000 may train the language model through the language modeling operation. For example, the electronic device 1000 may repeatedly analyzes the probability distribution of the word sequence extracted from the second corpus 1712-2 to train the language model. According to an embodiment of the disclosure, the electronic device 1000 training the language model by using the second corpus may correspond to a general language model learning process. In operation S770, the electronic device 1000 may generate the second prediction model by using the trained language model.

Figure 8:
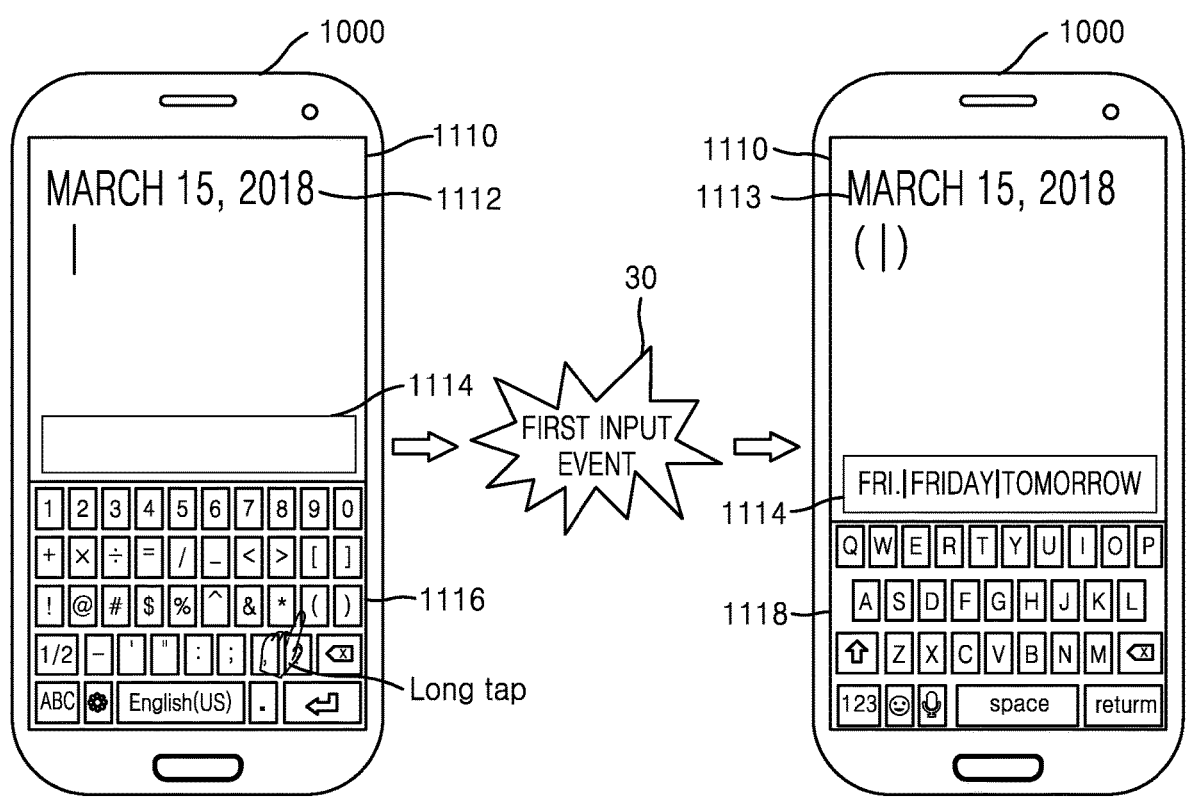
FIG. 8 is a diagram illustrating an operation, performed by an electronic device for providing a user interface when a user input for selecting a first symbol corresponds to a first input event according to an embodiment of the disclosure.

FIG. 8 is a diagram illustrating an operation, performed by an electronic device for providing a user interface when a user input for selecting a first symbol corresponds to a first input event according to an embodiment of the disclosure.

Referring to FIG. 8, according to an embodiment of the disclosure, the electronic device 1000 may display an input window 1112 indicating a text (e.g., Mar. 15, 2018) input by the user on a first region of the screen of the electronic device 1000. The electronic device 1000 receives a user input for selecting a first symbol (e.g., a parenthesis) and may determine a type of the user input for selecting the first symbol based on a user input pattern.

For example, the electronic device 1000 may identify whether the first symbol input by the user is a symbol used as a pair, and when the first symbol is the symbol used as a pair, the electronic device 1000 may determine whether a time period of the user input maintained for selecting the first symbol is equal to or greater than a preset threshold value. When the first symbol according to the user input is the symbol used as a pair and the time period of the user input maintained for selecting the first symbol is equal to or greater than the preset threshold value, the electronic device 1000 may determine that the user input is the first input event.

The user input pattern described herein may become a criterion that the electronic device 1000 uses to determine the type of the user input. For example, the user input pattern may include a time period of the user input maintained through the user interface. Also, the user input pattern may include, in addition to the time period of the user input maintained, whether the first symbol input by the user corresponds to a symbol to be used as a pair set in advance by the user, a user's text input manner for determining the user input for selecting the first symbol as the first input event based on history of the text input by the user before the first symbol input by the user, wherein the history indicates whether the text has been frequently used with the symbols that are used as pairs, etc.

For example, when the time period of the user input maintained for selecting the first symbol is greater than a certain threshold value set within 0 to 2 seconds through a first user interface 1116, the electronic device 1000 may determine the user input for selecting the first symbol as a first input event 30. When the user input for selecting the first symbol is determined as the first input event 30, the electronic device 1000 may display a second symbol that is used with the first symbol as a pair on the input window 1113 with the first symbol.

According to an embodiment of the disclosure, the electronic device 1000 may display the second symbol with the first symbol on the input window, and may further display a cursor indicating a location where the text is to be input between the first symbol and the second symbol. According to another embodiment of the disclosure, when the user input for selecting the first symbol is determined as the first input event, the electronic device 1000 may change the first user interface 1116 for inputting symbols to a second user interface 1118 for inputting text. Therefore, the user may not need to additionally input a key for changing the first user interface 1116 to the second user interface 1118.

When the user input for selecting the first symbol is determined as the first input event, the electronic device 1000 may display at least one candidate text to be input between the first symbol and the second symbol on a third region 1114 of the screen. For example, when receiving a user input of the first input event type for selecting the first symbol after the text 'Mar. 15, 2018' is input, the electronic device 1000 generates the first symbol and the second symbol, displays a cursor between the first symbol and the second symbol, and provides the candidate text such as 'Fri.', 'Friday', 'tomorrow', etc. that is to be input between the first symbol and the second symbol on the third region. An operation of the electronic device 1000 to recommend different candidate texts according to the type of the user input for selecting the first symbol will be described in detail below with reference to FIG. 9.

Figure 9:
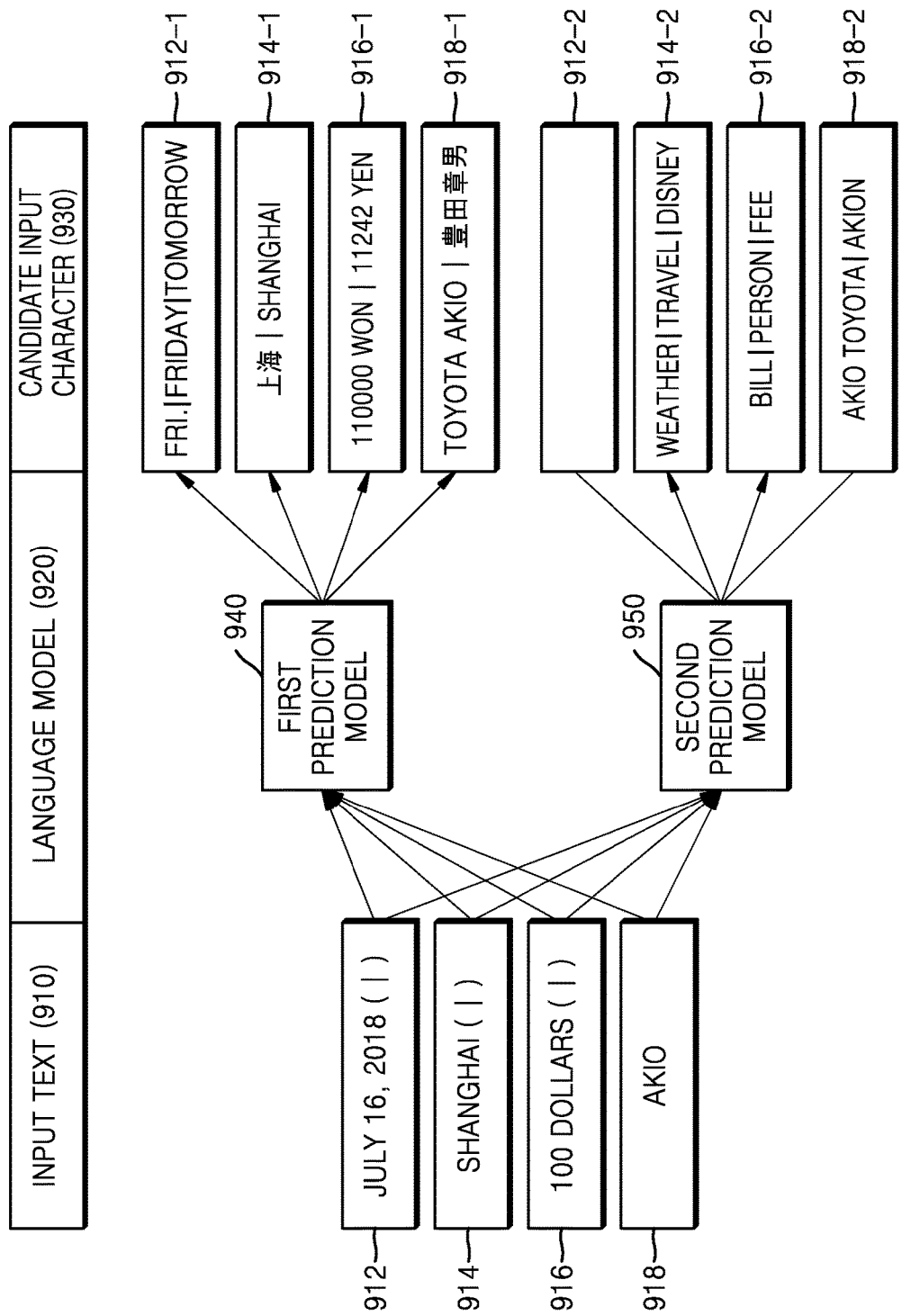
FIG. 9 is a diagram for comparing outputs of language models that are learned differently according to types of a user input, with respect to the same user input according to an embodiment of the disclosure.

FIG. 9 is a diagram for comparing outputs of language models that are trained differently according to types of a user input, with respect to the same user input according to an embodiment of the disclosure.

For example, the electronic device 1000 may display an input text 910 such as 'Jul. 16, 2018' 912, 'shanghai' 914, '100 dollars' 916, 'Akio' 918 input by the user, on the input window. After receiving the input text 910, the electronic device 1000 may receive a user input for selecting the first symbol. The electronic device 1000 may select one of stored language models (e.g., language model 920) according to a type of the user input for selecting the first symbol, and may display a candidate text (e.g., candidate input character 930) on the third region of the screen of the electronic device 1000 by using one selected language model.

For example, a case in which the input text such as 'Jul. 16, 2018' 912 is received and the first symbol is input will be described. After receiving the input text such as 'Jul. 16, 2018' (912), when the user input for selecting the first symbol is determined as the first input event, the electronic device 1000 may provide a candidate text such as 'Fri.', 'Friday', 'tomorrow' 912-1 based on a first prediction model 940. However, after receiving the input text such as 'Jul. 16, 2018' 912, when the user input for selecting the first symbol is determined as a second input event, the electronic device 1000 may not provide the recommended candidate text based on a second prediction model 950 (e.g., 912-2).

According to another embodiment of the disclosure, a case in which the electronic device 1000 receives an input text such as 'shanghai' 914 and receives an input of the first symbol will be described. After receiving the input text such as 'shanghai' 914, when the user input for selecting the first symbol is determined as the first input event, the electronic device 1000 may provide a candidate text such as '上海' or 'Shanghai' 914-1 based on the first prediction model 940. However, after receiving the input text such as 'shanghai' 914, when the user input for selecting the first symbol is determined as the second input event, the electronic device 1000 may provide a candidate text such as 'weather', 'travel', 'Disney' 914-2 based on the second prediction model 950.

According to another embodiment of the disclosure, a case in which the electronic device 1000 receives an input text such as '100 dollars' 916 and receives an input of the first symbol will be described. After receiving the input text such as '100 dollars' 916, when the user input for selecting the first symbol is determined as the first input event, the electronic device 1000 may provide a candidate text such as '110000 Won' or '11242 Yen' 916-1, that is, a result of converting $100 into another currency, based on the first prediction model 940. However, after receiving the input text such as '100 dollars' 916, when the user input for selecting the first symbol is determined as the second input event, the electronic device 1000 may provide a candidate text such as 'bill', 'person', 'fee' 916-2 based on the second prediction model 950.

According to another embodiment of the disclosure, a case in which the electronic device 1000 receives an input text such as 'Akio' 918 and receives an input of the first symbol will be described. After receiving the input text such as 'Akio' 918, when the user input for selecting the first symbol is determined as the first input event, the electronic device 1000 may provide a candidate text such as 'toyota akio' or '豊田章男' based on the first prediction model 940. However, after receiving the input text such as 'Akio' 918, when the user input for selecting the first symbol is determined as the second input event, the electronic device 1000 may provide a candidate text such as 'Akio toyota' or 'Akion' 918-2 based on the second prediction model 950. That is, the electronic device 1000 according to the disclosure may provide the candidate text that varies depending on the type of the user input for selecting the first symbol on the third region of the screen of the electronic device 1000.

TABLE 2

| Input text | Candidate text | Examples |
|---|---|---|
| Noun indicating time + bundle table | Date/time information | March 15 (Fri.), tomorrow (18 May) |
| Foreign language + bundle table | Original language | GDP (Gross domestic product), 해커 (Hacker) |
| Proper noun + bundle table | English abbreviation | Nuclear Non Proliferation Treaty (NPT), National Security Agency (NSA), Myungbak LEE (MB), social network service (SNS) |
| Chinese character in daily use + bundle table | English/Chinese character | North Korean Nuclear(北核), High(高)income |
| Number/unit + bundle table | Converted unit | 100 dollars (110000 Won), 1M (100 cm) |
| Pronunciation transcription + bundle table | Original language | shanghai(上海), akio(豊田章男) |

Referring to Table 2 above, examples of the candidate text to be input between the first symbol and the second symbol based on the first prediction model 940 when the electronic device 1000 receives the input text and the user input for selecting the first symbol is determined as the first input event will be described in detail below.

For example, when the input text is a noun indicating time, the electronic device 1000 may recommend a candidate text regarding date/time information corresponding to the noun indicating time between the first symbol and the second symbol. As another embodiment of the disclosure, when the input text is a foreign language, the electronic device 1000 may recommend the language corresponding to the foreign language as a candidate text between the first symbol and the second symbol.

Also, when the input text is a proper noun, the electronic device 1000 may recommend an English abbreviation corresponding to the proper noun as a candidate text between the first symbol and the second symbol, and when the input text is pronunciation transcription of Chinese character the electronic device 1000 may recommend a English character or a Chinese character corresponding to the Chinese character in daily use as a candidate text between the first symbol and the second symbol. Also, when the input text is numbers/units, the electronic device 1000 may recommend a converted number or a converted unit of the number or unit as a candidate text between the first symbol and the second symbol. In addition, when the input text is phonetic transcription, the electronic device 1000 may recommend the original language corresponding to the phonetic transcription as a candidate text between the first symbol and the second symbol.

Figure 10:
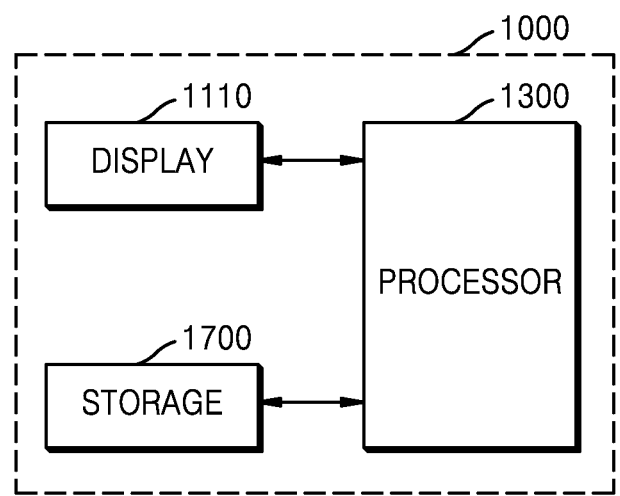
FIG. 10 is a block diagram of an electronic device according to an embodiment of the disclosure.

FIG. 10 is a block diagram of an electronic device according to an embodiment of the disclosure.

Figure 11:
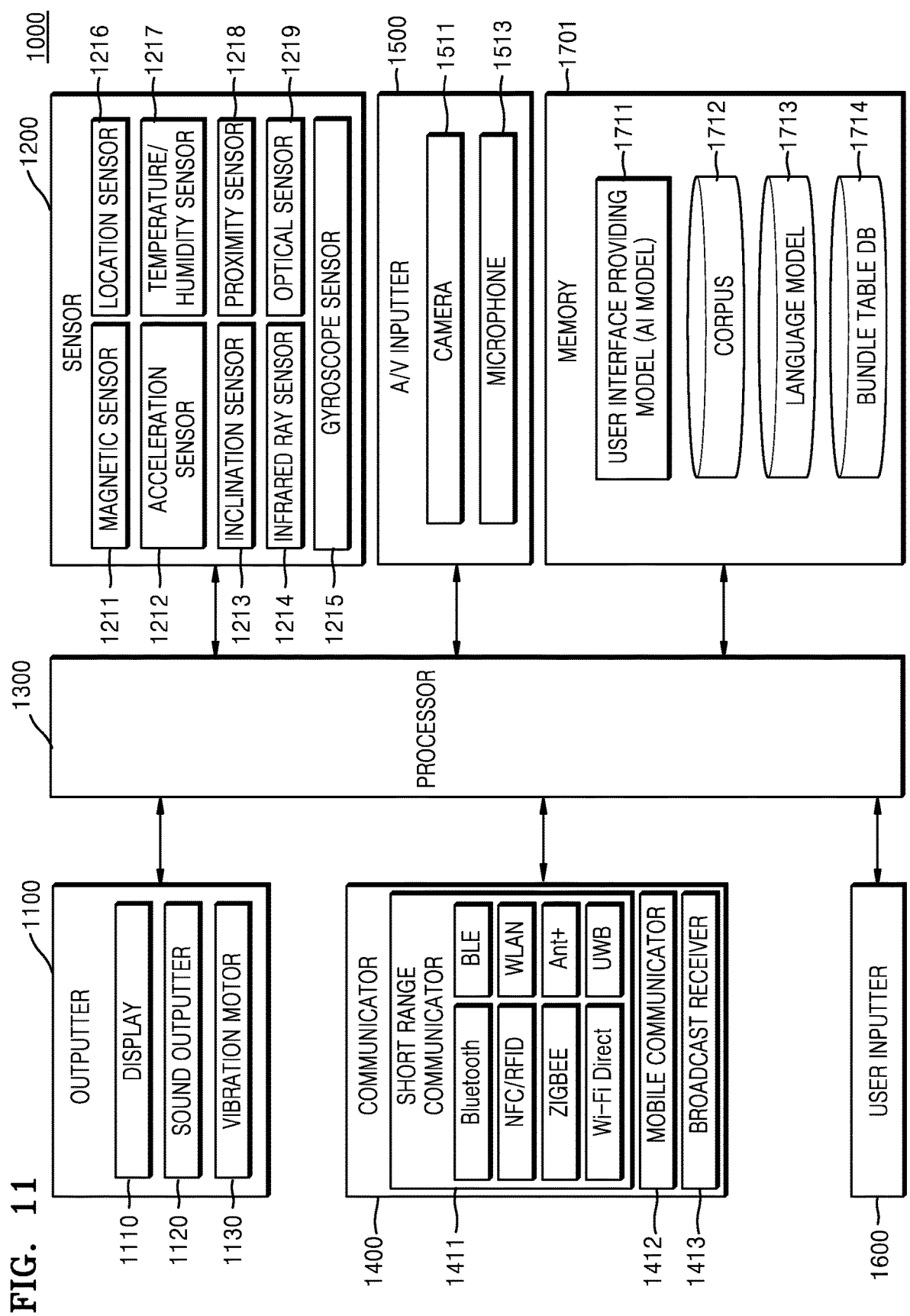
FIG. 11 is a block diagram of an electronic device according to an embodiment of the disclosure.

FIG. 11 is a block diagram of an electronic device according to an embodiment of the disclosure.

Referring to FIG. 10, the electronic device 1000 according to the embodiment of the disclosure may include a display 1110, a processor 1300, and a storage 1700. However, not all the elements in FIG. 10 are essential elements. The electronic device 1000 may be embodied with more elements than the shown elements or may be embodied with fewer elements than the shown elements.

For example, as shown in FIG. 11, the electronic device 1000 according to the embodiment of the disclosure may further include a sensor 1200, a communicator 1400, an audio/video (A/V) inputter 1500, and a user inputter 1600, in addition to an outputter 1100, the processor 1300, and the memory 1701. The storage 1700 as described herein may perform the same functions as those of the memory 1701. Hereinafter, the elements will be described below.

The outputter 1100 outputs an audio signal, a video signal, or a vibration signal, and may include the display 1110, a sound outputter 1120, a vibration motor 1130, etc. For example, the display 1110 may display the input window for indicating the text input by the user on the first region of the screen and may display the first user interface for selecting symbols on the second region of the screen.

The sound outputter 1120 outputs audio data transmitted from the communicator 1400 or stored in the memory 1701. Also, the sound outputter 1120 outputs a sound signal related to the functions performed in the electronic device 1000 (e.g., call signal reception sound, message reception sound, and notification sound). The sound outputter 1120 may include a speaker, a buzzer, etc. Also, according to an embodiment of the disclosure, the sound outputter 1120 may provide a response to the user input regarding the first input event and the second input event determined based on the user input pattern as voice.

The vibration motor 1130 may output a vibration signal. For example, the vibration motor 1130 may output a vibration signal corresponding to an output of audio data or video data (e.g., call signal reception sound, message reception sound, etc.) Also, the vibration motor 1130 may output a vibration signal when a touch input is received by the touch screen.

The outputter 1100 may provide a user interface for inputting text or symbols. The user interface may be provided as a message pop-up or a chatting window, or in a format of inputting/outputting voice, but is not limited thereto.

The outputter 1100 may provide, in addition to the first user interface for inputting symbols and the second user interface for inputting text, an input window for displaying the symbol or text input by the user, and a candidate text to be input between the first symbol and the second symbol.

The sensor 1200 may include, but is not limited to, at least one of a magnetic sensor 1211, an acceleration sensor 1212, an inclination sensor 1213, an infrared ray sensor 1214, a gyroscope sensor 1215, a location sensor (e.g., a global positioning system (GPS)) 1216, a temperature/humidity sensor 1217, a proximity sensor 1218, or an optical sensor 1219. Because one or ordinary skill in the art may intuitively infer functions of the sensors from the sensors' names, detailed descriptions thereof are omitted.

The processor 1300 controls overall operations of the electronic device 1000. For example, the processor 1300 may execute programs stored in the memory 1701 to control the outputter 1100, the sensor 1200, the communicator 1400, the A/V inputter 1500, the user inputter 1600, the memory 1701, etc. Also, the processor 1300 may include one or more processors, and the one or more processors may include a universal processor such as a central processing unit (CPU), application processor (AP), digital signal processor (DSP), etc., a graphical processor such as a graphics processing unit (GPU) or a vision processing unit (VPU), or an AI processor such as neural processing unit (NPU). According to an embodiment of the disclosure, when the processor 1300 includes the universal processor, the AI processor, and the graphic processor, the AI processor may be implemented as a separate chip from the universal processor or the graphic processor. For example, the one or more processors may control input data to be processed according to predefined operational rules or AI model stored in the memory. Alternatively, when the one or more processors include the AI processors, the AI processor may be designed as a hardware structure specified to process a certain AI model.

According to an embodiment of the disclosure, when the processor 1300 includes a plurality of processors, the graphic processor, or the AI processor such as NPU, at least some of the plurality of processors, the graphic processor, or the AI processor such as NPU may be loaded on the electronic device 1000 and another electronic device or server connected to the electronic device 1000.

The processor 1300 controls the display 1110 or the user inputter 1600 to receive the user input for selecting the first symbol through the first user interface. Also, the processor 1300 determines that the user input is the first input event for inputting text between the first symbol and the second symbol that is used with the first symbol as a pair based on the user input pattern, and when the user input for selecting the first symbol is determined as the first input event, the processor 1300 controls the display 1110 to display the first symbol and the second symbol on the input window.

According to an embodiment of the disclosure, the processor 1300 determines the type of the input event by using the AI model, determines user's intension to input the text between the bundle table according to the type of the determined input event. In addition, when the user has intended to input the text between the bundle table, the processor 1300 may adaptively provide the user interface to the user.

Also, when the user input for selecting the first symbol is determined as the first input event, the processor 1300 may change the first user interface displayed on the second region into the second user interface for inputting the text between the first symbol and the second symbol. For example, the processor 1300 may determine the type of the second user interface based on history information of the text that was used with the first symbol and the second symbol, and may change the first user interface to the second user interface based on the type of the determined second user interface.

According to an embodiment of the disclosure, the processor 1300 may train a third prediction model based on past history information about text used with the first symbol and the second symbol, and may determine a type of the second user interface by using the trained third prediction model.

Also, when the user input for selecting the first symbol is determined as the first input event, the processor 1300 may control the display 1110 to display the cursor indicating the location of the text that is to be input by the user between the first symbol and the second symbol.

According to an embodiment of the disclosure, the processor 1300 may identify whether the first symbol input by the user is used as a pair, by using a table defining at least one pair of symbols. The processor 1300 may control the display 1110 to display at least one candidate text to be input between the first symbol and the second symbol on the third region of the screen, based on the type of the user input for selecting the first symbol.

When a time period of the user input through the first user interface is equal to or greater than a preset threshold value, the processor 1300 may determine the user input for selecting the first symbol as the first input event for inputting text between the first symbol and the second symbol. Also, when the time period of the user input maintained through the first user interface is less than the threshold value, the processor 1300 may determine the user input for selecting the first symbol as the second input event for displaying the first symbol on the input window.

The processor 1300 may select one of a plurality of language models that are learned based on the usage history information about the text that has been used by the user, based on the type of the user input for selecting the first symbol. Also, the processor 1300 may receive recommendation of at least one candidate text from the selected language model, and may control the display 1110 to display the recommended at least one candidate text on the third region.

For example, when the user input for selecting the first symbol corresponds to the first input event, the processor 1300 receives recommendation of a first candidate character group from the first prediction model that is trained based on information about the text that has been used with the symbol used as a pair by the user in the usage history information, and may display the display 1110 to display the recommended first candidate character group on the third region.

For example, when the user input for selecting the first symbol corresponds to the second input event, the processor 1300 may receive recommendation of a second candidate character group from the second prediction model that is trained based on the usage history information and may control the display 1110 to display the recommended second candidate character group on the third region. The AI model according to the embodiment of the disclosure may include at least one of the first prediction model, the second prediction model, or the third prediction model.

As described above, the processor 1300 may execute a method of providing the user interface on the screen by using at least one of the AI processor for generating the candidate text or adaptively providing the user interface, the graphic processor, or the universal processor. That is, the electronic device 1000 may provide the user interface by using the plurality of processors.

According to an embodiment of the disclosure, the electronic device 1000 may perform an operation of receiving a user input or displaying an image (e.g., an operation of receiving a user input for selecting the first symbol through the first user interface, an operation of displaying the first symbol or the second symbol, and an operation of displaying candidate text) from among operations of the electronic device 1000 by using the universal processor, may perform an operation of recognizing user's intension or recommending certain information (e.g., an operation of determining whether the user input for selecting the first symbol corresponds to the first input event, an operation of recommending candidate characters according to whether the user input corresponds to the first input event, an operation of generating and displaying the second symbol that is used with the first symbol as a pair, an operation of changing the first user interface for inputting the first symbol or the second symbol into the second user interface, and an operation of displaying a cursor indicating a location of the text between the first symbol and the second symbol) by using the AI processor, but is not limited thereto.

That is, the electronic device 1000 determines necessary processing resources in executing the method of effectively providing the user interface, and may use at least one of the universal processor, the graphic processor, or the AI processor based on the determined processing resources.

According to an embodiment of the disclosure, predefined operation rules or AI model for operating the electronic device 1000 is obtained through training. Here, obtaining through the training may denote that the predefined operation rules or AI model that is set to execute a desired characteristic (or purpose) is made from a basic AI model that learns a plurality of pieces of learning data through a learning algorithm. The learning may be performed in the device executing the AI operation or may be performed via an additional server and/or system. The learning algorithm may include supervised learning, unsupervised learning, semi-supervised learning, or reinforcement learning, but is not limited thereto.

For example, the processor may obtain learning data for training of the AI model from an input device in the electronic device or an external device capable of communicating with the electronic device. That is, the processor may obtain data about types of events, data about symbol pairs (data about the text used with the symbols that are used as pairs and data about the text used by the user) in order for the AI model to learn.

According to an embodiment of the disclosure, the processor may pre-process the data obtained for training of the AI model. For example, the processor may process the obtained data in a preset format. According to an embodiment of the disclosure, the processor may select the learning data according to preset criteria (e.g., a region of generating the learning data, a time of generating the learning data, a size of the learning data, a genre of the learning data, a generator of the learning data, types of objects in the learning data, etc.) for the training of the AI model, and may also generate, through the learning, rules and models for selecting the criteria of selecting the learning data for the training of AI model.

For example, the AI model used by the electronic device may include a plurality of neural network layers. Each of the plurality of neural network layers has a plurality of weight values, and performs a neural network calculation by calculating a calculation result of a previous layer with the plurality of weight values. The plurality of weight values in each of the plurality of neural network layers may be optimized according to a learning result of the AI model. For example, during the learning process, the plurality of weight values may be updated to reduce or minimize loss values or cost values obtained from the AI model. The AI neural network may include a deep neural network (DNN), for example, a convolutional neural network (CNN), a deep neural network (DNN), a recurrent neural network (RNN), a restricted Boltzman machine (RBM), a deep belief network (DBN), a bidirectional recurrent deep neural network (BRDNN), or a deep Q-network, but is not limited thereto.

The communicator 1400 may include one or more elements allowing the electronic device 1000 and a wearable device or the electronic device 1000 and a server 2000 to communicate with each other. For example, the communicator 1400 may include a short-range wireless communicator 1411, a mobile communicator 1412, and a broadcast receiver 1413.

The short-range wireless communicator 1411 may include, but is not limited to, a Bluetooth communicator, a Bluetooth low energy (BLE) communicator, a near field communication unit, a WLAN (Wi-Fi) communicator, a ZigBee communicator, an infrared-ray data association (IrDA) communicator, a Wi-Fi direct (WFD) communicator, an ultra wideband (UWB) communicator, an Ant+ communicator, etc.

The mobile communicator 1412 may transmit/receive a wireless signal to/from at least one of a base station, an external terminal, or a server through a mobile communication network. Here, the wireless signal may include a voice call signal, a video call signal, or various types of data according to transmission/reception of texts/multimedia messages.

The broadcast receiver 1413 receives a broadcast signal and/or broadcast-related information from outside via a broadcast channel. The broadcast channel may include satellite channels and terrestrial channels. In some embodiments of the disclosure, the electronic device 1000 may not include the broadcast receiver 1413.

According to an embodiment of the disclosure, the communicator 1400 may obtain biometric information of a user of an external device. For example, the communicator 1400 may collect heart rate information, respiration information, body temperature information, etc. of the user from a wearable device connected to the electronic device 1000.

The A/V inputter 1500 is for inputting an audio signal or a video signal, and may include a camera 1511, a microphone 1513, etc. The camera 1511 may obtain image frames such as a still image, a video, etc. by using an image sensor in a video call mode or a photographing mode. An image captured by the image sensor may be processed by the processor 1300 or an additional image processor (not shown). The image frame processed by the camera 1511 may be stored in the memory 1701 or may be transmitted to outside via the communicator 1400. According to an embodiment of the disclosure, the camera 1511 may include at least one of a telephoto camera, a wide-angle camera, or a general camera, but is not limited thereto.

The microphone 1513 receives a sound signal from outside and processes the sound signal as electrical voice data. For example, the microphone 1513 may receive a sound signal from an external device or a narrator. The microphone 1513 may use various noise cancelling algorithms for cancelling noise generated when receiving the sound signal from the outside.

The user inputter 1600 denotes a unit allowing the user to input text or symbols into the electronic device 1000. For example, the user inputter 1600 may include, but is not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, or the like.

The memory 1701 may store processing and controlling programs of the processor 1300, or may store input/output data (e.g., voice data, picture images, metadata, personalized learning data, corpus language models, database in which bundle tables are defined, etc.) The memory 1701 may include a storage medium of at least one type of a flash memory type, a hard disk type, a multimedia card micro type, a card type memory (e.g., an secure digital (SD) or extreme digital (XD) memory, etc.), random access memory (RAM), a static RAM (SRAM), a read-only memory (ROM), an electrically erasable programmable ROM (EE-PROM), a programmable (PROM), a magnetic memory, a magnetic disk, and an optical disk.

The programs stored in the memory 1701 may be classified as a plurality of modules according to functions thereof, for example, a user interface providing model 1711. The user interface providing model 1711 may allow the electronic device 1000 to learn the operations of receiving the user input for selecting the first symbol, displaying the second symbol on the input window with the first symbol based on the received user input, displaying the cursor indicating a location of the text to be input between the first symbol and the second symbol, changing the first user interface to the second user interface, and displaying at least one candidate text to be input between the first symbol and the second symbol on the third region of the screen. According to an embodiment of the disclosure, the user interface providing model 1711 may include instructions to instruct the language models 1713 to learn based on usage history information of the text used by the user. The user interface providing model 1711 stored in the memory 1701 may be provided by at least one of an operating system (OS) or a predetermined application.

The memory 1701 may include a corpus 1712. The corpus 1712 may include the first corpus 1712-1 and the second corpus 1712-2. Also, the memory 1701 may include a plurality of language models 1713 that learned based on the usage history information of the text used by the user, and may further include a database (DB) 1714, in which bundle tables are defined.

Figure 12:
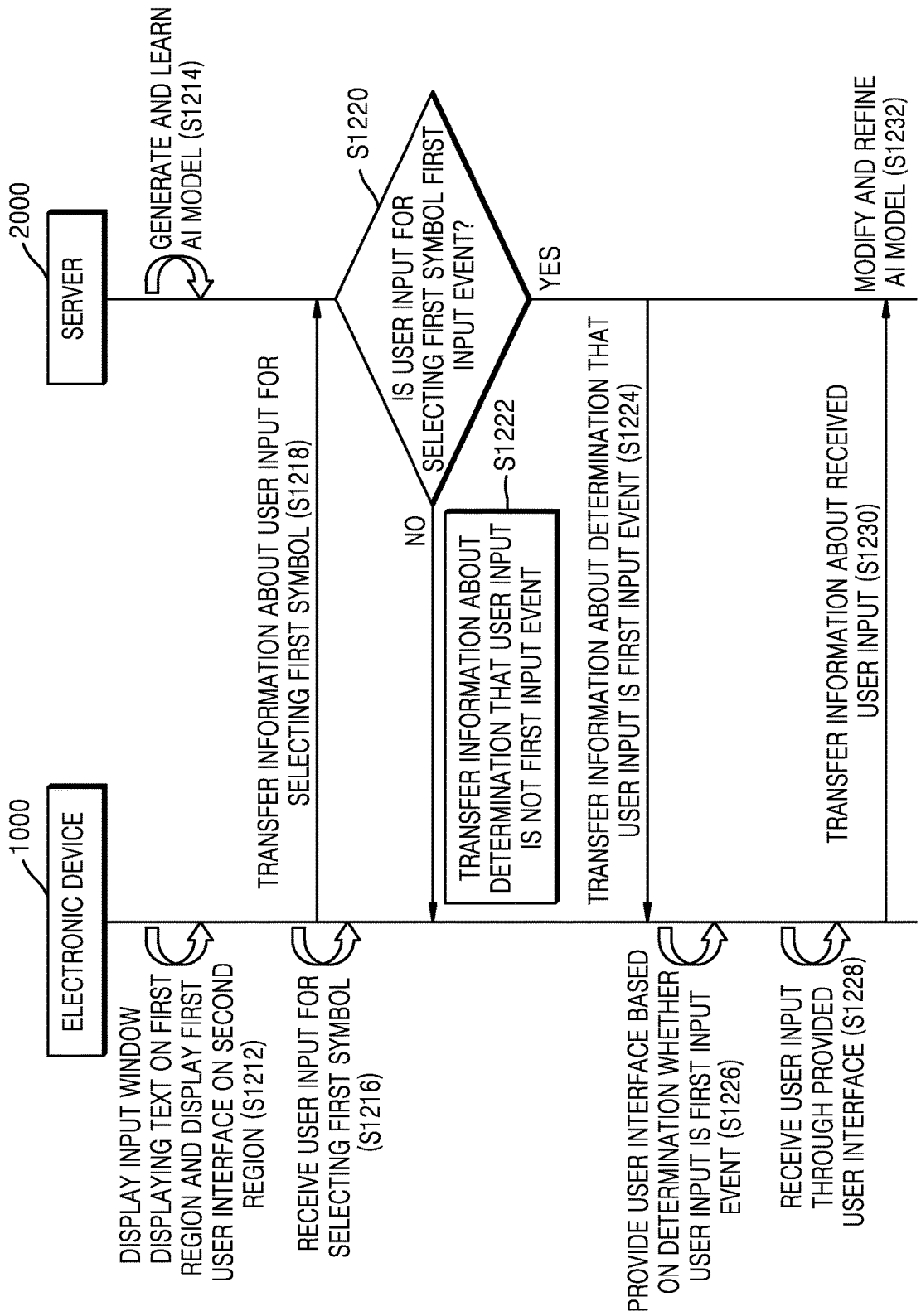
FIG. 12 is a diagram of an example, in which an electronic device and a server learn and recognize data in linkage with each other according to an embodiment of the disclosure.

FIG. 12 is a diagram of an example, in which an electronic device and a server learn and recognize data in linkage with each other according to an embodiment of the disclosure.

Referring to FIG. 12, the server 2000 may generate and train the AI model for determining a type of input event of the user input for selecting the first symbol and determining of the user's intension to input the text between the bundle table according to the determined type of the input event. The server 2000 may transfer information about the determined user's intension or the type of the input event to the electronic device 1000, and thus the electronic device 1000 may adaptively provide the user interface.

For example, in operation S1212, the electronic device 1000 may display the input window for displaying text on the first region of the screen and display the first user interface on the second region. In operation S1214, the server 2000 may generate an AI model for determining the type of the input event of the user input and may train the AI model in advance.

In operation S1216, the electronic device 1000 may receive the user input for selecting the first symbol. In operation S1218, the electronic device 1000 may transmit information about the user input for selecting the first symbol to the server 2000.

In operation S1220, the server 2000 may determine whether the user input for selecting the first symbol is the first input event by using the received information about the user input. In operation S1222, the server 2000 may transmit to the electronic device 1000 information about the determination that the user input is not the first input event. In operation S1224, the server 2000 may transmit to the electronic device 1000 information about the determination that the user input is the first input event.

In operation S1226, the electronic device 1000 may provide the user interface based on the determination transmitted from the server 2000 about whether the user input is the first input event. For example, when the electronic device 1000 receives the determination that the user input corresponds to the first input event from the server 2000, the electronic device 1000 displays the first symbol and the second symbol on the input window, changes the first user interface into the second user interface for inputting text between the first symbol and the second symbol, and displays the cursor indicating a location of the text between the first symbol and the second symbol.

According to an embodiment of the disclosure, when receiving the determination that the user input does not correspond to the first input event from the server 2000, the electronic device 1000 may display the first symbol and the cursor next to the first symbol.

In operation S1228, the electronic device 1000 may receive a user input into the provided user interface. For example, when receiving the determination that the user input corresponds to the first input event from the server 2000, the electronic device 1000 may display the text input by the user on the input window based on the location of the cursor between the first symbol and the second symbol. In operation S1230, the electronic device 1000 may transmit information about the user input into the provided user interface to the server 2000. In operation S1232, the server 2000 may modify and refine the AI model that has trained already by using the information about the user input received through the provided user interface.

For example, when receiving the determination that the user input for selecting the first symbol corresponds to the first input event, the electronic device 1000 displays the first symbol and the second symbol on the input window, and at the same time, provides the user interface for changing the first user interface into the second user interface. In addition, when a new user input is received through the provided user interface, the electronic device 1000 transmits the user input to the server 2000 so that the server 20000 may modify and refine the AI model that is already trained. That is, the electronic device 1000 may make the AI model operate according to the user's intension by using the user input to the provided user interface as feedback information.

Referring to FIG. 12, it is determined whether the user input for selecting the first symbol corresponds to the first input event by using the AI model stored in the server 2000, but one or more embodiments of the disclosure are not limited thereto.

According to an embodiment of the disclosure, the server 2000 may obtain data for making the AI model learn and may select the data used to make the AI model learn, and may further perform a pre-process of the selected data in a preset format.

The method of providing the user interface on a screen by the electronic device according to an embodiment of the disclosure may be implemented in the form of program commands executable through diverse computing means and may be recorded in computer readable media. The computer-readable media may also include, alone or in combination with the program commands, data files, data structures, etc. The media and program commands may be those specially designed and constructed for the purposes, or they may be of the type well-known and available to those of skill in the computer software arts. Also, a computer program product including a recording medium having a program stored therein may be provided, wherein the program performs the method of providing the user interface on the screen by the electronic device according to the embodiment of the disclosure.

Examples of computer-readable media include magnetic media such as hard disks, floppy disks, and magnetic tape; optical media such as compact disk read only memory (CD ROM) disks and digital versatile disc (DVD); magneto-optical media such as floptical disks; and hardware devices that are specially to store and perform program commands, such as read-only memory (ROM), random access memory (RAM), flash memory, etc. Examples of the program commands may include not only machine language codes but also high-level language codes which are executable by various computing means by using an interpreter.

Some embodiments of the disclosure may be embodied in a storage medium including instruction codes executable by a computer or processor such as a program module executed by the computer. The computer-readable storage medium may be any available medium that may be accessed by a computer, and includes volatile and non-volatile media and removable and non-removable media. Also, the computer-readable medium may include both a computer storage medium and a communication medium. The computer storage medium may include volatile and non-volatile media and removable and non-removable media that are implemented using any method or technology for storing information, such as computer-readable instructions, a data structure, a program module, or other types of data. The communication medium typically includes computer-readable instructions, a data structure, a program module, or other data of modulated data signal such as carrier waves, or other transmission mechanisms, and includes an arbitrary information transfer medium. In addition, some of the embodiments of the disclosure may be implemented as a computer program including instructions executable by a computer such as a computer program executed by a computer or a computer program product.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by an electronic device, of providing a user interface on a screen of the electronic device, the method comprising:
    displaying an input window on a first region of the screen, the input window displaying a text input by a user;
    displaying a first user interface on a second region of the screen, the first user interface being provided to select a symbol;
    receiving a user input for selecting a first symbol through the first user interface;
    when a time period of the user input maintained through the first user interface is equal to or greater than a preset threshold value, determining the user input for selecting the first symbol as the first input event for inputting a text between the first symbol and the second symbol that is used as a pair with the first symbol and displaying the first symbol and the second symbol on the input window;
    when the time period of the user input maintained through the first user interface is less than the preset threshold value, determining the user input for selecting the first symbol as a second input event for displaying the first symbol on the input window; and
    changing the first user interface displayed on the second region into a second user interface for inputting a text between the first symbol and the second symbol.

2. The method of claim 1, wherein the displaying of the first symbol and the second symbol on the input window comprises:
    displaying a cursor between the first symbol and the second symbol, the cursor indicating a location of a text that is to be input by the user.

3. The method of claim 1, wherein the displaying of the first symbol and the second symbol on the input window comprises:
    identifying whether the first symbol is a symbol used as a pair, by using a table in which at least one pair of symbols is defined.

4. The method of claim 1, wherein the first symbol and the second symbol comprise a bundle table.

5. The method of claim 1, further comprising:
    displaying at least one candidate text on a third region of the screen, wherein the at least one candidate text is input between the first symbol and the second symbol.

6. The method of claim 5, wherein the displaying of the at least one candidate text on the third region of the screen comprises:
    selecting one of a plurality of language models that are learned based on usage history information about the text, based on a type of the user input for selecting the first symbol;
    receiving a recommendation of the at least one candidate text from the selected language model; and
    displaying the at least one candidate text on the third region.

7. The method of claim 6, wherein the displaying of the at least one candidate text on the third region comprises:
    when the received user input for selecting the first symbol corresponds to the first input event, receiving a recommendation of a first candidate character group from a first prediction model trained based on information about a text that is used by the user with the symbols used as pairs from among the usage history information about the text; and displaying the first candidate character group on the third region.

8. The method of claim 6, wherein the displaying of the candidate text on the third region comprises:
    when the received user input for selecting the first symbol corresponds to the second input event, receiving a recommendation of a second candidate character group from a second prediction trained based on the usage history information; and
    displaying the second candidate character group on the third region.

9. The method of claim 1, wherein the changing of the first user interface into the second user interface comprises:
    determining a type of the second user interface based on history information of a text that has been used by the user with the first symbol and the second symbol.

10. An electronic device comprising:
    a display configured to:
        display an input window on a first region of a screen, the input window displaying a text input by a user, and
        display a first user interface on a second region of the screen, the first user interface being provided to select a symbol; and
    a processor configured to:
        receive a user input for selecting a first symbol through the first user interface,
        when a time period of the user input maintained through the first user interface is equal to or greater than a preset threshold value, determine the user input for selecting the first symbol as the first input event for inputting a text between the first symbol and the second symbol that is used as a pair with the first symbol and display the first symbol and the second symbol on the input window,
        when the time period of the user input maintained through the first user interface is less than the preset threshold value, determine the user input for selecting the first symbol as a second input event for displaying the first symbol on the input window, and
        change the first user interface displayed on the second region into a second user interface for inputting a text between the first symbol and the second symbol.

11. The electronic device of claim 10, wherein the processor is further configured to control the display to display a cursor between the first symbol and the second symbol, the cursor indicating a location of a text that is to be input by the user.

12. The electronic device of claim 10, wherein the processor is further configured to identify whether the first symbol is a symbol used as a pair, by using a table in which at least one pair of symbols is defined.

13. The electronic device of claim 10, wherein the first symbol and the second symbol comprise a bundle table.

14. The electronic device of claim 10, wherein the processor is further configured to control the display to display at least one candidate text on a third region of the screen, the at least one candidate text being input between the first symbol and the second symbol.

15. The electronic device of claim 14, wherein the processor is further configured to:
    select one of a plurality of language models that are learned based on usage history information about the text that has been used by the user, based on a type of the user input for selecting the first symbol,
    receive a recommendation of the at least one candidate text from the selected language model, and
    control the display to display the at least one candidate text on the third region.

16. The electronic device of claim 15, wherein the processor is further configured to:
   when the received user input for selecting the first symbol corresponds to the first input event, receive a recommendation of a first candidate character group from a first prediction model trained based on information about a text that is used by the user with the symbols used as pairs from among the usage history information about the text, and
   control the display to display the recommended first candidate character group on the third region.

17. The electronic device of claim 15, wherein the processor is further configured to:
   when the received user input for selecting the first symbol corresponds to the second input event, receive a recommendation of a second candidate character group from a second prediction trained based on the usage history information, and
   control the display to display the recommended second candidate character group on the third region.

18. A non-transitory computer-readable recording medium having recorded thereon a program to be executed on a computer, the program configured to cause the computer to:
   display an input window on a first region of a screen of an electronic device, the input window displaying a text input by a user;
   display a first user interface on a second region of the screen, the first user interface being provided to select a symbol;
   receive a user input for selecting a first symbol through the first user interface;
   when a time period of the user input maintained through the first user interface is equal to or greater than a preset threshold value, determining the user input for selecting the first symbol as the first input event for inputting a text between the first symbol and the second symbol that is used as a pair with the first symbol and displaying the first symbol and the second symbol on the input window;
   when the time period of the user input maintained through the first user interface is less than the preset threshold value, determining the user input for selecting the first symbol as a second input event for displaying the first symbol on the input window; and
   change the first user interface displayed on the second region into a second user interface for inputting a text between the first symbol and the second symbol.

* * * * *